United States Patent
Besarla et al.

(10) Patent No.: US 10,648,719 B2
(45) Date of Patent: May 12, 2020

(54) HEATING, VENTILATING, AIR CONDITIONING, AND REFRIGERATION SYSTEM WITH SIMULTANEOUS SUB-COOLING AND SUPERHEAT CONTROL

(71) Applicant: DunAn Microstaq, Inc., Austin, TX (US)

(72) Inventors: Dhaman K. Besarla, Leander, TX (US); Colin B. Bingle, Austin, TX (US); Kevin C. Sinkar, Austin, TX (US); Eric S. Shea, Austin, TX (US)

(73) Assignee: Dunan Microstaq, Inc., Austin, TX (US)

( * ) Notice: Subject to any disclaimer, the term of this patent is extended or adjusted under 35 U.S.C. 154(b) by 96 days.

(21) Appl. No.: 16/163,855

(22) Filed: Oct. 18, 2018

(65) Prior Publication Data

US 2019/0186800 A1 Jun. 20, 2019

Related U.S. Application Data

(60) Provisional application No. 62/598,492, filed on Dec. 14, 2017.

(51) Int. Cl.
*F25B 49/02* (2006.01)
*F25B 40/06* (2006.01)
(Continued)

(52) U.S. Cl.
CPC ............. *F25B 49/02* (2013.01); *F25B 40/02* (2013.01); *F25B 40/06* (2013.01); *F25B 41/04* (2013.01);
(Continued)

(58) Field of Classification Search
CPC .......... F25B 49/02; F25B 40/02; F25B 41/04; F25B 40/06; F25B 41/062; F25B 2600/19;
(Continued)

(56) References Cited

U.S. PATENT DOCUMENTS 3,402,564 A * 9/1968 Nussbaum ............... F24F 3/153
62/173
3,529,432 A * 9/1970 Nussbaum ................ F25B 1/00
62/196.3
(Continued)

*Primary Examiner* — Kun Kai Ma
(74) *Attorney, Agent, or Firm* — MacMillan, Sobanski & Todd, LLC

(57) ABSTRACT

A method of controlling fluid flow through a heating, ventilating, air conditioning, and refrigeration (HVAC-R) system includes measuring temperature and pressure at an outlet of an evaporator of the HVAC-R system, wherein the evaporator is in fluid communication with a compressor, a condenser, an expansion device between the evaporator and the condenser, and a flow control valve between the compressor and the condenser, and measuring a sub-cooling temperature at an outlet of the condenser. The measured evaporator temperature and pressure data is sent to a first superheat processor, and the measured sub-cooling temperature data is send to a second superheat processor. A control signal to the expansion device from the first superheat processor and a control signal to the flow control valve from the second superheat processor are then simultaneously sent.

20 Claims, 3 Drawing Sheets

(51) Int. Cl.
*F25B 41/06* (2006.01)
*F25B 40/02* (2006.01)
*F25B 41/04* (2006.01)

(52) U.S. Cl.
CPC ........ *F25B 41/062* (2013.01); *F25B 2600/19* (2013.01); *F25B 2600/21* (2013.01); *F25B 2600/2513* (2013.01); *F25B 2700/197* (2013.01); *F25B 2700/21163* (2013.01); *F25B 2700/21175* (2013.01)

(58) Field of Classification Search
CPC .......... F25B 2600/21; F25B 2600/2513; F25B 2600/25; F25B 2700/21163; F25B 2700/21175; F25B 2700/19; F25B 2700/25; F25B 1/00
See application file for complete search history.

(56) References Cited

U.S. PATENT DOCUMENTS

| | | | | |
|---|---|---|---|---|
| 5,651,258 | A * | 7/1997 | Harris | F24F 3/153 |
| | | | | 62/173 |
| 5,655,379 | A * | 8/1997 | Jaster | F25B 41/065 |
| | | | | 137/392 |
| 7,018,558 | B2 * | 3/2006 | Schnur | C10M 105/38 |
| | | | | 252/68 |
| 9,140,613 | B2 | 9/2015 | Arunasalam et al. | |
| 9,797,639 | B2 | 10/2017 | Schmidt | |
| 10,018,393 | B2 * | 7/2018 | Kopko | F25B 41/00 |
| 2006/0162358 | A1 * | 7/2006 | VanderZee | F25B 49/02 |
| | | | | 62/225 |
| 2006/0266063 | A1 * | 11/2006 | Groll | F25B 1/10 |
| | | | | 62/228.5 |
| 2009/0277197 | A1 | 11/2009 | Gambiana et al. | |
| 2011/0209485 | A1 * | 9/2011 | Lifson | F25B 49/02 |
| | | | | 62/115 |
| 2014/0013782 | A1 * | 1/2014 | Kopko | F25B 1/06 |
| | | | | 62/115 |
| 2014/0326002 | A1 * | 11/2014 | Sunderland | F25B 49/027 |
| | | | | 62/56 |
| 2015/0352604 | A1 * | 12/2015 | Arunasalam | F16K 99/0044 |
| | | | | 137/15.06 |

* cited by examiner

HEATING, VENTILATING, AIR CONDITIONING, AND REFRIGERATION SYSTEM WITH SIMULTANEOUS SUB-COOLING AND SUPERHEAT CONTROL

BACKGROUND OF THE INVENTION

This invention relates in general to heating, ventilating, air conditioning, and refrigeration (HVAC-R) systems. In particular, this invention relates to an improved HVAC-R system structure and an improved method of simultaneously controlling an expansion valve in an HVAC-R system to achieve improved cooling of an evaporator, and a flow control valve in the HVAC-R system to improve operation of a condenser.

In some conventional HVAC-R systems, an expansion valve is controlled based on the superheat. Superheat control is achieved using pressure sensor and a temperature sensor to measure HVAC-R system fluid pressure and temperature, respectively. Superheat is then calculated for a particular refrigerant using the measured temperature and pressure, and controlled by causing the superheat to move to a target superheat value by adjusting the pressure and temperature using any of a group of known open-loop or closed-loop algorithms.

Superheat is a function of pressure and temperature, and is conventionally calculated using pressure-temperature (P-T) charts that map a saturation temperature at a particular pressure. The values of the saturation temperatures at particular pressures may vary with different refrigerants. These values for saturation temperature and a temperature of the refrigerant are typically measured at an outlet of an evaporator in the conventional HVAC-R system, and are typically used to calculate superheat.

In other known HVAC-R systems, a refrigerant charge is used to control the sub-cooling before the HVAC-R system is started. While the HVAC-R system is in operation the refrigerant charge cannot be added or removed. Thus, the sub-cooling may not be optimized while system is in operation. Sub-cooling may also be calculated for a particular refrigerant using the measured temperature and pressure, and may be controlled by causing the sub-cooling to move to a target sub-cooling value by adjusting the pressure and temperature using any of a group of known open-loop or closed-loop algorithms.

Sub-cooling is a function of pressure and temperature, and may be conventionally calculated using pressure-temperature (P-T) charts that map a saturation temperature at a particular pressure. The values of the saturation temperatures at particular pressures may vary with different refrigerants. These values for saturation temperature and a temperature of the refrigerant are typically measured at an outlet of a condenser in the conventional HVAC-R system, and are typically used to calculate sub-cooling.

It would be desirable however, to provide an improved HVAC-R system structure and an improved method of controlling the expansion valve by controlling sub-cooling at an outlet of the condenser and controlling superheat at an outlet of the evaporator.

SUMMARY OF THE INVENTION

This invention relates to an improved HVAC-R system structure and an improved method of simultaneously controlling an expansion valve in an HVAC-R system to achieve improved cooling of an evaporator, and a flow control valve in the HVAC-R system to improve operation of a condenser.

In one embodiment a method of controlling fluid flow through a heating, ventilating, air conditioning, and refrigeration (HVAC-R) system includes measuring temperature and pressure at an outlet of an evaporator of the HVAC-R system, wherein the evaporator is in fluid communication with a compressor, a condenser, an expansion device between the evaporator and the condenser, and a flow control valve between the compressor and the condenser, and measuring a sub-cooling temperature at an outlet of the condenser. The measured evaporator temperature and pressure data is sent to a first superheat processor, and the measured sub-cooling temperature data is send to a second superheat processor. A control signal to the expansion device from the first superheat processor and a control signal to the flow control valve from the second superheat processor are then simultaneously sent.

In another embodiment, a heating, ventilating, air conditioning, and refrigeration (HVAC-R) system includes an evaporator, a compressor, a condenser, an expansion device between the condenser and the evaporator, and a flow control valve between the compressor and the condenser. A sub-cooling controller is connected between the condenser and the expansion device and is configured to measure refrigerant fluid temperature at an outlet of the condenser and calculate sub-cooling therefrom, and is further configured to provide a control signal to the flow control valve. A superheat controller is connected between the evaporator and the compressor and is configured to measure refrigerant fluid pressure and temperature and to calculate superheat therefrom, and further configured to provide a control signal to the expansion device.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
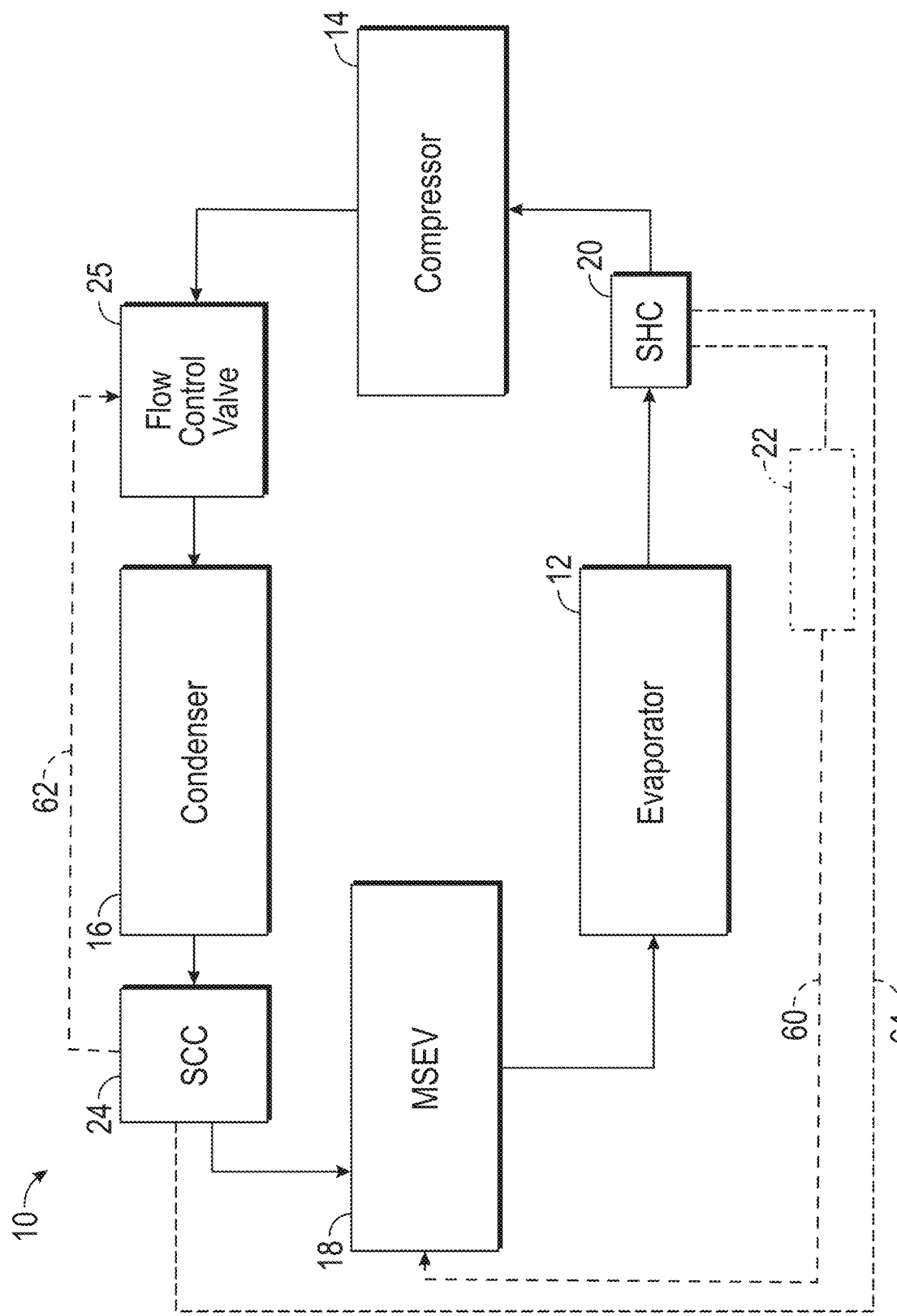
FIG. 1 a block diagram of a first embodiment of an HVAC-R system according to the invention.

Referring now to FIG. 1, there is illustrated at 10 a block diagram of a first embodiment of a HVAC-R system in accordance with this invention. Other than an improved processor 22 of a superheat controller (SHC) 20, a sub-cooling controller (SCC) 24, and flow control valve 25, the illustrated HVAC-R system 10 is, in large measure, conventional in the art and is intended merely to illustrate one environment in which this invention may be used. Thus, the scope of this invention is not intended to be limited for use with the specific structure for the HVAC-R system 10 illustrated in FIG. 1 or with refrigeration systems in general. On the contrary, as will become apparent below, this invention may be used in any desired environment for the purposes described below.

As is well known in the art, the HVAC-R system 10 circulates a refrigerant through a closed circuit, where it is sequentially subjected to compression, condensation, expansion, and evaporation. The circulating refrigerant removes heat from one area (thereby cooling that area) and expels the heat in another area.

To accomplish this, the illustrated HVAC-R system 10 includes an evaporator 12, such as an evaporator coil. The evaporator 12 is conventional in the art and is adapted to receive a relatively low pressure liquid refrigerant at an inlet thereof. A relatively warm fluid, such as air, can be caused to flow over the evaporator 12, causing the relatively low pressure liquid refrigerant flowing in the evaporator 12 to expand, absorb heat from the fluid flowing over the evaporator 12, and evaporate within the evaporator 12. The relatively low pressure liquid refrigerant entering into the inlet of the evaporator 12 is thus changed to a relatively low pressure refrigerant gas exiting from an outlet of the evaporator 12.

The outlet of the evaporator 12 communicates with an inlet of a compressor 14. The compressor 14 may be conventional in the art and is adapted to compress the relatively low pressure refrigerant gas exiting from the evaporator 12 and to move such relatively low pressure refrigerant gas through the HVAC-R system 10 at a relatively high pressure. The relatively high pressure refrigerant gas is discharged from an outlet of the compressor 14 that communicates with an inlet of a condenser 16. The condenser 16 may be conventional in the art and is configured to remove heat from the relatively high pressure refrigerant gas as it passes therethrough. As a result, the relatively high pressure refrigerant gas condenses and becomes a relatively high pressure refrigerant liquid.

The relatively high pressure refrigerant liquid then moves from an outlet of the condenser 16 to an inlet of an expansion device. In the illustrated embodiment, the expansion device is a Modular Silicon Expansion Valve (MSEV) 18, described below, that is configured to restrict the flow of refrigerant therethrough. As a result, the relatively high pressure refrigerant liquid is changed to a relatively low pressure refrigerant liquid as it leaves the expansion device. The relatively low pressure refrigerant liquid is then returned to the inlet of the evaporator 12, and the refrigeration cycle is repeated.

The illustrated embodiment of the HVAC-R system 10 additionally includes at least one external sensor, configured as the SHC 20, described below, and that communicates with the fluid line that provides fluid communication from the evaporator 12 to the compressor 14. The SHC 20 is responsive to one or more properties of the fluid in the fluid line (such as, for example, pressure measured by a pressure sensor portion 42, and temperature measured by a temperature sensor portion 44, both described below) for generating a signal that is representative of that or those properties to a controller or processor, such as the processor 22. In response to the signal from the SHC 20 (and, if desired, other non-illustrated sensors or other inputs), the processor 22 generates a signal to control the operation of the MSEV 18 via a wire or cable 60. Alternatively, the SHC 20 may be connected to the MSEV 18 by a wireless connection.

MSEVs, such as the MSEV 18 are electronically controlled, normally closed, and single flow directional valves, and may be used for refrigerant fluid mass flow control in conventional HVAC and HVAC-R applications.

The exemplary MSEV 18 illustrated in FIG. 1 is a two-stage proportional control valve. The first stage is a microvalve (not shown) configured as a pilot valve to control a second stage spool valve (not shown). When the microvalve (not shown) receives a Pulse Width Modulation (PWM) signal from the processor 22, the microvalve (not shown) modulates to change the pressure differential across the second stage spool valve (not shown). The spool valve (not shown) will move to balance the pressure differential, effectively changing an orifice opening of the MSEV 18 to control a desired amount of refrigerant flow.

U.S. Pat. No. 9,140,613 discloses a superheat controller (SHC). The SHC disclosed therein is a single, self-contained, stand-alone device which contains all the sensors, electronics, and intelligence to automatically detect a fluid type, such as refrigerant, and report the superheat of multiple common fluid types used in residential, industrial, and scientific applications. U.S. Pat. No. 9,140,613 is incorporated herein in its entirety.

Figure 2:
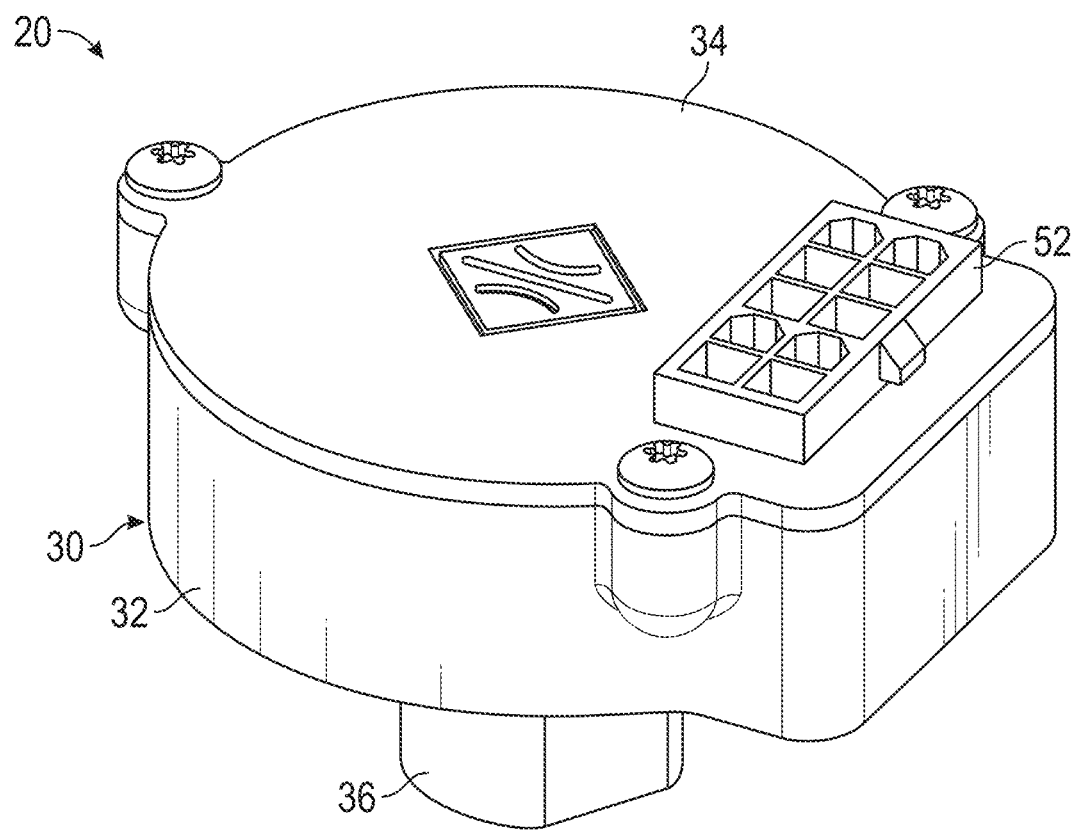
FIG. 2 is a perspective view of the known universal superheat controller illustrated in FIG. 1.
Figure 3:
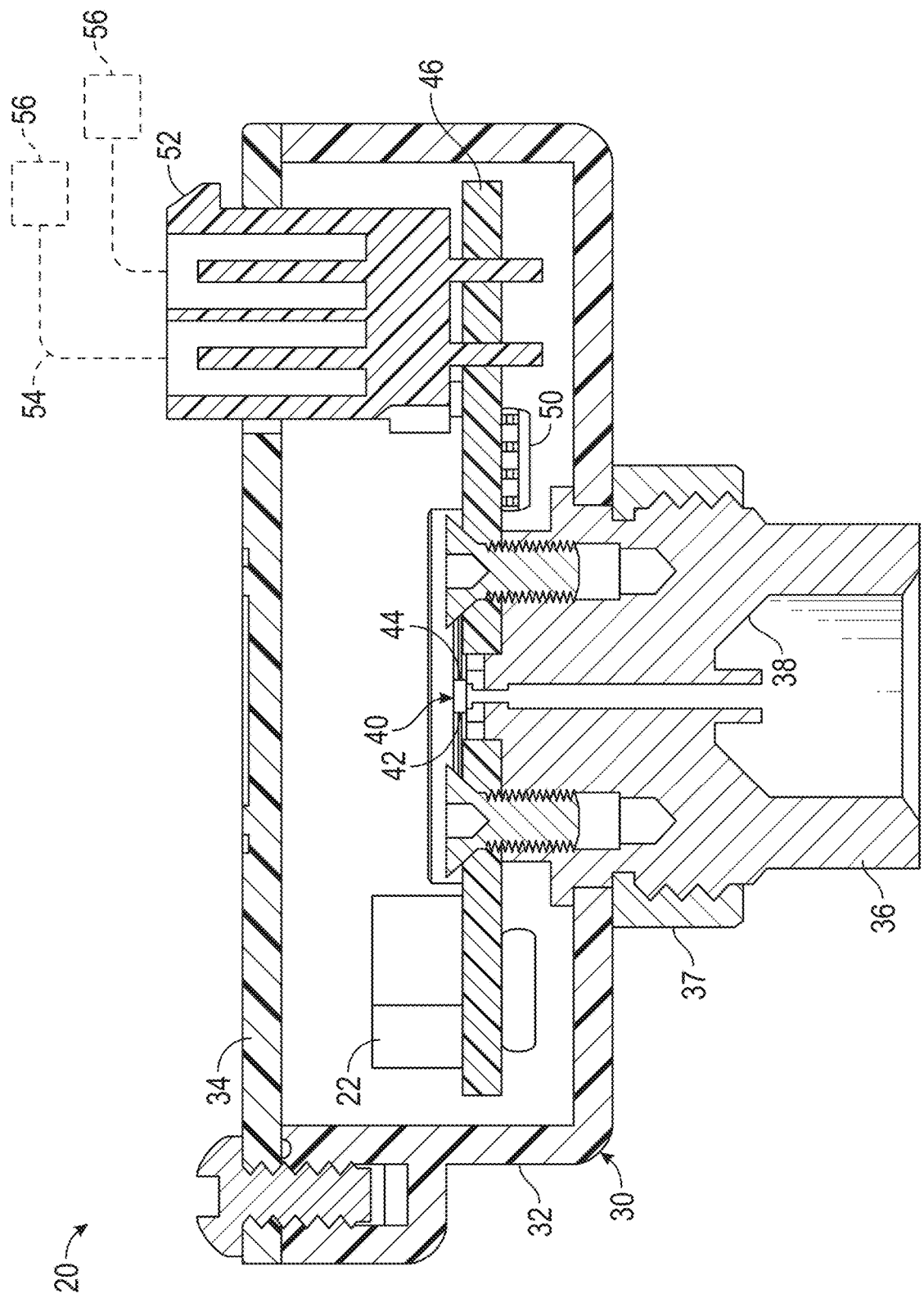
FIG. 3 is a cross sectional view of the universal superheat controller illustrated in FIG. 2.

FIGS. 2 and 3 herein illustrate the SHC 20, which is similar to the superheat controller disclosed in U.S. Pat. No. 9,140,613. The SHC 20, like the HVAC-R system 10 described above, is in large measure, conventional in the art and is intended merely to illustrate one device in which this invention may be used. Thus, the scope of this invention is not intended to be limited for use with the specific structure for the SHC 20 illustrated in FIGS. 2 and 3 or with devices configured to detect and report superheat in a fluid system in general. On the contrary, as will become apparent below, this invention may be used in any desired device for the purposes described below.

As shown in FIGS. 2 and 3, the illustrated embodiment of the SHC 20 includes a housing 30 having a body 32, a cover 34, and a fluid inlet member 36. The fluid inlet member 36 may be secured to the housing 30 by a mounting ring 37. The mounting ring 37 attaches the fluid inlet member 36 to the housing 30 portion by a threaded connection. Alternatively, the mounting ring 37 may be attached to the fluid inlet member 36 by any desired method, such as by welding or press fitting. In the embodiment illustrated in FIGS. 2 and 3, the fluid inlet member 36 is a brass fitting having a centrally formed opening that defines a sealing surface 38.

The SHC 20 includes an integrated pressure and temperature sensor 40 having pressure sensor portion 42 and a temperature sensor portion 44 mounted to a printed circuit board (PCB) 46. The superheat processor 22, a data-reporting or communication module 50, and an Input/Output (IO) module 52 are also mounted to the PCB 46. The IO module 52 is a physical hardware interface that accepts input power and reports data through available hard-wired interfaces, such as wires or cables 54, to the superheat processor 22. Target devices 56 that may be connected to the SHC 20 via the IO module 52 may include additional temperature sensors, laptop and notebook computers, cell phones, memory cards, and any device used in or with conventional end of the line test equipment. Alternatively, the target devices 56 may be connected to the communication module 50 by a wireless connection.

The superheat processor 22 is mounted to the PCB 46 and is a high-resolution, high-accuracy device that processes the input signals from the pressure and temperature sensor portions 42 and 44, respectively, of the integrated pressure and temperature sensor 40, detects the fluid type, calculates the superheat of the fluid, and provides an output that identifies the level of the calculated superheat.

The superheat processor 22 generates a signal to control the operation of the MSEV 18 at the inlet of the evaporator 12, therefore controlling a desired amount of refrigerant flow to the evaporator 12.

The superheat processor 22 may also be configured to provide other data, such as fluid temperature, fluid pressure, fluid type, relevant historical dates maintained in an onboard memory (such as alarm and on-off history), and other desired information. Advantageously, the superheat processor 22 maintains a high level of accuracy over a typical operating range of pressure and temperature after a one-time calibration. Non-limiting examples of suitable superheat processors include microcontrollers, Field Programmable Gate Arrays (FPGAs), and Application Specific Integrated Circuits (ASICs) with embedded and/or off-board memory and peripherals.

Although the superheat processor 22 is shown in FIG. 3 as a component of the SHC 20, it will be understood that the superheat processor 22 may be mounted to the HVAC-R system 10 external of the SHC 20, such as illustrated by the phantom line 22 in FIG. 1.

Referring again to FIG. 1, the illustrated embodiment of the HVAC-R system 10 includes the SCC 24. The SCC 24 may be substantially the same as the SHC 20, includes the superheat processor 22, and is configured to communicate with a fluid line that provides fluid communication from the condenser 16 to the evaporator 12.

Additionally and advantageously, the flow control valve 25 is configured to communicate with the fluid line that provides fluid communication from the compressor 14 to the condenser 16. The flow control valve 25 may be conventional in the art and configured to control the flow of fluid into the condenser 16. Examples of suitable flow control valves include, but are not limited to adjustable high pressure control valves.

Advantageously, the HVAC-R system 10 is configured to actively control sub-cooling via the flow control valve 25. The SCC 24 is responsive to one or more properties of the fluid in the fluid line (such as, for example, pressure measured by the pressure sensor portion 42, and temperature measured by the temperature sensor portion 44) for generating a signal that is representative of that or those properties to a controller or processor, such as the processor 22. In response to the signal from the SCC 24 (and, if desired, other non-illustrated sensors or other inputs), the processor 22 generates a signal to control the operation of the flow control valve 25 at the inlet of the condenser 16 via a wire or cable 62. The flow control valve 25 is therefore able to achieve and maintain a desired sub-cooling value at the outlet of the condenser 16. Alternatively, the SCC 24 may be connected to the flow control valve 25 by a wireless connection.

At the same time, the superheat processor 22 of the SHC 20 processes the input signals from the pressure and temperature sensor portions 42 and 44, respectively, of the integrated pressure and temperature sensor 40, detects the fluid type, calculates the superheat of the fluid, and provides an output signal to the MSEV 18 to adjust the mass flow rate of fluid traveling into the evaporator 12, thus maintaining a desired level of superheat in the HVAC-R system 10.

A control algorithm may be provided in one or both of the SCC 24 and the SHC 20, or to an additional processor (not shown, but operatively mounted within or near the SCC 24 or the SHC 20) that integrates the signals from the SCC 24 and the SHC 20 to simultaneously control the MSEV 18 and the flow control valve 25. Thus, the SCC 24 and the SHC 20 may be electronically connected via wire or cable 64.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of controlling fluid flow through a heating, ventilating, air conditioning, and refrigeration (HVAC-R) system comprising:

measuring temperature and pressure at an outlet of an evaporator of the HVAC-R system, wherein the evaporator is in fluid communication with a compressor, a condenser, an expansion device between the evaporator and the condenser, and a flow control valve between the compressor and the condenser;

measuring a sub-cooling temperature at an outlet of the condenser;

sending the measured evaporator temperature and pressure data to a first superheat processor;

sending the measured sub-cooling temperature data to a second superheat processor; and simultaneously sending a control signal to the expansion device from the first superheat processor and a control signal to the flow control valve from the second superheat processor.

2. The method according to claim 1, wherein the control signal from the first superheat processor to the expansion device is configured to ensure a stable mass flow rate of the refrigerant fluid traveling into the evaporator.

3. The method according to claim 1, wherein the control signal from the second superheat processor to the flow control valve is configured to ensure a stable sub-cooling value of the refrigerant fluid traveling into the condenser.

4. The method according to claim 1, wherein the expansion device is a modular silicon expansion valve.

5. The method according to claim 1, wherein the flow control valve is an adjustable high pressure control valve.

6. The method according to claim 4, wherein the modular silicon expansion valve is a two-stage proportional control valve, wherein a first stage is a microvalve configured as a pilot valve to control a second stage spool valve, wherein when the microvalve receives a Pulse Width Modulation (PWM) signal from a superheat processor operatively connected to the superheat controller, the microvalve modulates to change a pressure differential across the second stage spool valve, and wherein the spool valve will move to balance the pressure differential, changing an orifice opening of the modular silicon expansion valve to control a desired amount of refrigerant flow.

7. The method according to claim 1, wherein the first superheat processor is an integrated component of a superheat controller and electrically connected to the superheat controller.

8. The method according to claim 7, wherein the superheat controller includes an integrated pressure sensor.

9. The method according to claim 8, wherein the superheat controller includes an integrated temperature sensor.

10. The method according to claim 1, wherein the second superheat processor is an integrated component of a sub-cooling controller and electrically connected to the sub-cooling controller.

11. The method according to claim 10, wherein the sub-cooling controller includes an integrated pressure sensor.

12. The method according to claim 11, wherein the sub-cooling controller includes an integrated temperature sensor.

13. The method according to claim 9, further including one of a temperature sensor, a computer, a cell phone, and a memory card, mounted externally to the superheat controller and electrically connected thereto.

14. The method according to claim 13, further including the step of sending data from the one of a temperature sensor, a computer, a cell phone, and a memory card to the superheat processor.

15. The method according to claim 12, further including one of a temperature sensor, a computer, a cell phone, and a memory card, mounted externally to the sub-cooling controller and electrically connected thereto.

16. The method according to claim 15, further including the step of sending data from the one of a temperature sensor, a computer, a cell phone, and a memory card to the sub-cooling processor.

17. A heating, ventilating, air conditioning, and refrigeration (HVAC-R) system comprising:
   an evaporator;
   a compressor;
   a condenser;
   an expansion device between the condenser and the evaporator;
   a flow control valve between the compressor and the condenser;
   a sub-cooling controller between the condenser and the expansion device, the sub-cooling controller configured to measure refrigerant fluid temperature at an outlet of the condenser and calculate sub-cooling therefrom, and further configured to provide a control signal to the flow control valve; and
   a superheat controller between the evaporator and the compressor, the superheat controller configured to measure refrigerant fluid pressure and temperature and to calculate superheat therefrom, and further configured to provide a control signal to the expansion device.

18. The HVAC-R system according to claim 17, wherein the expansion valve is a modular silicon expansion valve.

19. The HVAC-R system according to claim 17, wherein the flow control valve is an adjustable high pressure control valve.

20. The HVAC-R system according to claim 18, wherein the modular silicon expansion valve is a two-stage proportional control valve, wherein a first stage is a microvalve configured as a pilot valve to control a second stage spool valve, wherein when the microvalve receives a Pulse Width Modulation (PWM) signal from a superheat processor operatively connected to the superheat controller, the microvalve modulates to change a pressure differential across the second stage spool valve, and wherein the spool valve will move to balance the pressure differential, changing an orifice opening of the modular silicon expansion valve to control a desired amount of refrigerant flow.

* * * * *